Feb. 11, 1964     F. G. ZAGAR     3,120,766

GUN TYPE DRILLING MEANS

Filed April 14, 1961

*INVENTOR.*
FRANK G. ZAGAR
BY *Evans & Pearne*

Attys.

United States Patent Office 3,120,766
Patented Feb. 11, 1964

3,120,766
GUN TYPE DRILLING MEANS
Frank G. Zagar, Cleveland, Ohio, assignor to Zagar, Inc., Cleveland, Ohio, a corporation of Ohio
Filed Apr. 14, 1961, Ser. No. 102,997
5 Claims. (Cl. 77—62)

This invention relates to drills and drilling apparatus and particularly to an improved means of producing short or long holes of high accuracy using pressurized feed of cutting fluid which may cool and/or lubricate the cutting tip of the drill and/or aid in flushing chips out of the drill.

A particular advantage of the present invention is the achievement of drilling of this general type in a manner which makes it practical for application where drill costs have heretofore been prohibitive.

Another significant advantage of the invention is its adaptability to drilling of relatively small diameters of 1/4" or 1/8" or less. It has not generally been practical to employ gun drills, or other type drills, with pressurized cutting fluids at such small diameters.

The invention contemplates the provision of a gun drill having a cylindrical shank terminatintg in a cutting tip which may be of conventional design and which has principal cutting edges, and which according to the invention further has a flute and at least one relatively shallow longitudinal depression which is shorter than the flute which is mountable in bushing means so as to extend through the bushing means from a coolant egress zone, past a cutting fluid feed zone to the cutting tip of the drill. The relationship is such that the flute extends to the egress zone and the depression extends only to the feed zone and not to the egress zone when the cutting tip of the drill is at the work-presentation end of the bushing and also when the cutting tip of the drill projects beyond the work-presentation end of the bushing by a distance not exceeding the cutting-stroke range of the drilling apparatus.

These features will become clearer from the following exemplary description of an article of manufacture and apparatus employing the invention.

Figure 1:
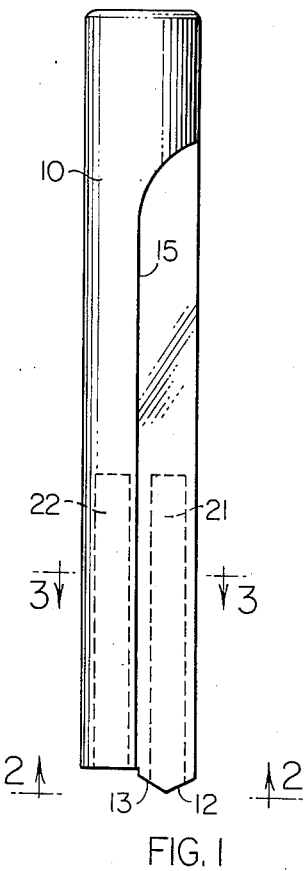
FIGURE 1 is a side elevation of a gun drill contemplated by the invention.
Figure 2:
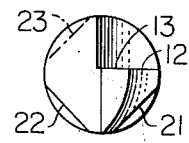
FIGURE 2 is an end view taken from the plane of line 2—2 in FIGURE 1.
Figure 3:
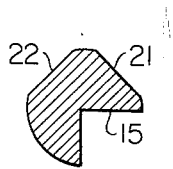
FIGURE 3 is a sectional view taken from the plane of line 3—3 in FIGURE 1.

The gun drill shown perhaps most clearly in FIGURES 1–3 comprises a cylindrical shank 10 terminating at a cutting tip, generally indicated by the reference numeral 11 and having principal cutting edges 12 and 13, the cutting tip of the drill being of substantially conventional design except that the diameter of the drill may optionally be substantially smaller than that usually associated with gun drills employing pressurized cutting fluids, for example 1/8 inch or less.

The drill is provided with a flute 15 extending from the cutting tip 11 to a first termination point. Since the flute 15 intersects the cutting tip of the drill at the cutting edges 12 and 13, it will be clear that the flute 15 is in a condition of relatively direct juxtaposition with the cutting edges 12 and 13 at the cutting tip 11. There are also provided relatively shallow longitudinal depressions 21 and 22 each of which extends from the cutting tip 11 upwardly to an associated termination point which is intermediate the cutting tip 11 and the termination point of the flute 15. In the particular example shown, the depressions 21 and 22 are in the form of flats each having a width approximately equal to the radius of the cylindrical shank of the drill. However other depressions having other cross-sectional shapes may be employed. For example the depression 21 may be replaced with a small groove of circular cross-section.

Since the depressions 21 and 22 do not intersect the cutting tip of the drill at the principal cutting edges 12 and 13, it will be apparent that, while fluid fed along these depressions to the cutting tip will communicate with the cutting edges 12 and 13 by passing into the lower edge of the flute 15, the depressions 21 and 22 are themselves in a condition of relatively indirect juxtaposition with the cutting edges 12 and 13 at the locations where the depressions 21 and 22 communicate with the cutting tip of the drill.

Although it is presently preferred to provide the depressions 21 and 22, one of these may be eliminated in some applications. Also, additional depressions may be employed when advantageous. For example a depression 23 (shown by phantom line in FIGURE 2 only) might be provided in addition to depressions 21 and 22. The depression 23 could have the same length as the depressions 21 and 22.

Figure 4:
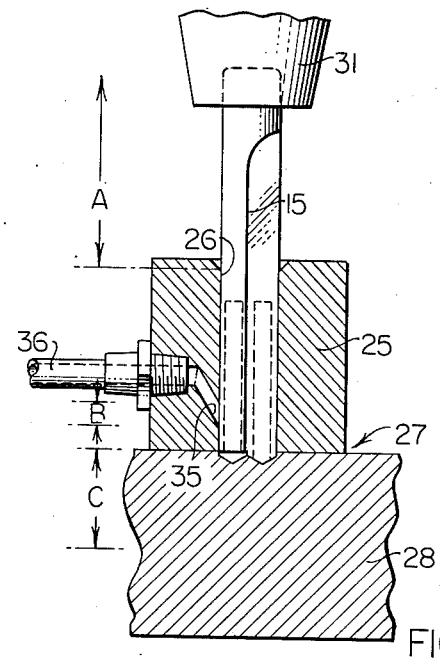
FIGURE 4 is a cross-section on a reduced scale illustrating the drill of FIGURE 1 together with other drilling apparatus including a bushing, with the cutting tip of the drill being located approximately at the work-presentation end of the bushing.
Figure 5:
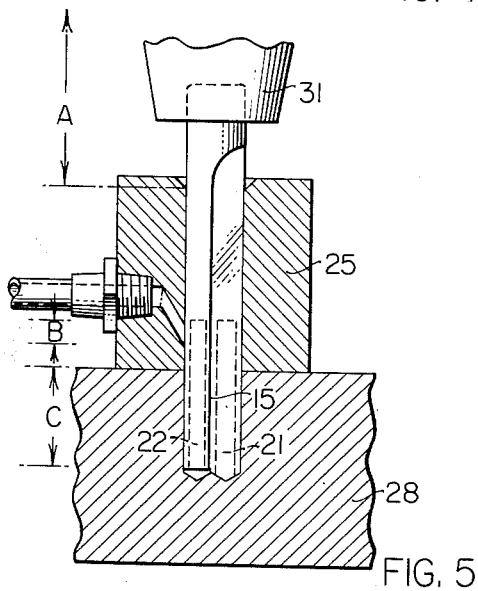
FIGURE 5 is a view similar to FIGURE 4 but in which the cutting tip of the drill projects beyond the work-presentation end of the bushing by a distance equal to thet cutting-stroke range of the drilling apparatus.

In FIGURES 4 and 5, the drill of FIGURES 1–3 is shown in association with a bushing in a manner contemplated by the invention. The bushing 25 surrounds the drill and has a bore 26 for receiving the drill. The bushing has a work-presentation end generally indicated by the reference numeral 27 and to which a workpiece 28 is presented in fluid-tight relationship with the bushing 25.

The drill and the bushing 25 are in disassociated relationship with respect to both stroking movement and rotative movement. The drill may rotate within the bushing and the drill may be stroked downwardly through the bushing during the drilling operation, or the bushing together with the workpiece 28 may be stroked upwardly along the axially stationary drill. An advantage of the present invention is that it lends itself to rotation of the tool within the bushing with the bushing 25 and workpiece 28 being maintained in a stationary condition. In this case, the bushing 25 may be mounted on or fixed in a suitable jig plate (not shown). The drill is mounted in suitable chuck means and stroked by suitable quill means, both of which may be located within the head 31.

As mentioned above, the axial feeding or stroking movement may be accomplished by either (1) the drill or (2) the bushing and associated workpiece.

The drill extends from its head 31 through the bushing means from a coolant egress zone A past a cutting fluid feed zone B to the cutting tip 11. The cutting fluid feed zone B is defined by a cutting fluid feed port 35 which opens into the bore 26 and which in turn is supplied with cutting fluid by suitable supply lines and passages such as the cutting fluid supply line 36. The supply line 36 leads from a suitable pressure source (not shown).

The apparatus is shown in FIGURE 4 at the very start of the cutting or drilling operation. In FIGURE 5, the apparatus is shown at the conclusion of the feeding stroke, which may also be termed the cutting stroke. The cutting tip of the drill and the workpiece move with respect to each other through the distance C in the course of the drilling operation which starts at the condition shown in FIGURE 4 and concludes at the condition shown in FIGURE 5.

It will be noted that the flute 15 extends from the cutting tip into the egress zone A in the condition shown in FIGURE 4 and in the condition shown in FIGURE 5. Also the depressions 21 and 22 extend from the cutting tip only to the feed zone B and not to the egress zone A in the condition shown in FIGURE 4 and in the condition shown in FIGURE 5.

As the drilling operation proceeds, and the drill is stroked throughout the cutting-stroke range, the pressurized fluid fed through the line 36 to the port 35 successively enters the depressions 22 and 21 and the flute 15 during each rotation of the drill. Fluid entering the depression 22 is forced downwardly to the cutting tip. Fluid entering the depression 21 is similarly forced downwardly to the cutting tip. Such fluids fed from the depressions 22 and 21 to the cutting tip escape through the flute 15 which at all times opens to the egress zone A.

As the drill continues in its rotation, the port 35 is presented to the flute 15. There is a momentary hiatus in the full-pressure infeed of the cutting fluid to the cutting tip since the cutting fluid is free to escape along the flute 15 directly to the egress zone A. Shortly thereafter, in the rotation of the drill, the flute 15 passes out of register with the port 35 and the depressions 22 and 21 successively come into register with the port to again accomplish the pressure infeed of the cutting fluid. The intermittent registration of the flute 15 with the port 35 accomplishes an intermittent direct feed of the incoming cutting fluid to the egress zone. This provides a pulsing action which may aid in some applications in ejection of the chips.

The illustrated example of the invention will suggest variations to those familiar with machine tool design. For example, a thin gasket may be provided between the bushing 25 and the work in order to improve the fluid seal therebetween. Other changes or elaborations are possible. Accordingly, the scope of the invention is not to be limited to devices embodying all the specific details of the illustrated example but is to be defined by the following claims.

What is claimed is:

1. Drilling apparatus comprising a drill having a cylindrical shank terminating in a cutting tip, bushing means for surrounding said drill, said bushing means having a bore for receiving said drill and having a work-presentation end to which work to be drilled is to be presented in fluid-tight relationship with said bushing means, said drill and said work-presentation end of said bushing means being in disassociated relationship with respect to stroking movement and rotative movement, said drill extending through said bushing means from a coolant egress zone past a cutting fluid feed zone to said cutting tip of said drill with said cutting fluid feed zone being defined by at least one cutting fluid feed port opening into said bore around a portion of the periphery thereof, cutting fluid feed means communicating with said feed port, said drill having at least one flute extending from said cutting tip and at least one shallower longitudinal depression of constant length in said cylindrical shank and also extending from said cutting tip, said flute extending to said egress zone and said depression extending only to said feed zone and not to said egress zone when said cutting tip of said drill is at said one end of said bushing means and when said cutting tip of said drill projects beyond said one end of said bushing means throughout a distance not exceeding the cutting-stroke range of the drilling apparatus.

2. Drilling apparatus comprising a drill having a cylindrical shank terminating in a cutting tip, bushing means for surrounding said drill, said bushing means having a bore for receiving said drill and having a work-presentation end to which work to be drilled is to be presented in fluid-tight relationship with said bushing means, said drill being rotatable in said bushing, said drill being longitudinally slidable within said bushing to accommodate stroking movement of said drill, said drill extending through said bushing means from a coolant egress zone past a cutting fluid feed zone to said cutting tip of said drill with said cutting fluid feed zone being defined by at least one cutting fluid feed port opening into said bore around a portion of the periphery thereof, cutting fluid feed means communicating with said feed port, said drill having at least one flute extending from said cutting tip and at least one shallower longitudinal depression of constant length in said cylindrical shank and also extending from said cutting tip, said flute extending to said egress zone and said depression extending only to said feed zone and not to said egress zone when said cutting tip of said drill is at said one end of said bushing means and when said cutting tip of said drill projects beyond said one end of said bushing means throughout a distance not exceeding the cutting-stroke range of the drilling apparatus.

3. A gun drill comprising a solid cylindrical shank terminating in a cutting tip, at least one relatively deep flute extending from said cutting tip along said shank to a first termination point, at least one unobstructed longitudinal depression of constant length in the surface of said cylindrical shank and extending from said cutting tip along said shank and terminating at a point intermediate said cutting tip and said first termination point, the surface of said cylindrical shank remaining cylindrical throughout the length of said last named depression.

4. A gun drill comprising a solid cylindrical shank terminating in a cutting tip having principal cutting edges, a relatively deep flute extending to a first termination point and from a condition of relatively direct juxtaposition at said cutting tip with said cutting edges, at least one relatively shallow unobstructed longitudinal depression of constant length extending to a second termination point from a condition of relatively indirect juxtaposition at said cutting tip with said cutting edges, said second termination point being intermediate said cutting tip and said first termination point, the surface of said cylindrical shank remaining cylindrical throughout the length of said last named depression.

5. A gun drill comprising a solid cylindrical shank terminating in a cutting tip having principal cutting edges, at least one flute extending to a first termination point and from a condition of relatively direct juxtaposition at said cutting tip with said cutting edges, at least one unobstructed longitudinal depression of constant length extending to a second termination point from a condition of relatively indirect juxtaposition at said cutting tip with said cutting edges, said second termination point being intermediate said cutting tip and said first termination point, the surface of said cylindrical shank remaining cylindrical throughout the length of said last named depression.

References Cited in the file of this patent

UNITED STATES PATENTS

| | | |
|---|---|---|
| 2,418,021 | Fleischer | Mar. 25, 1947 |
| 2,510,203 | Andreasson | June 6, 1950 |
| 2,552,463 | Searles | May 8, 1951 |
| 2,674,908 | Willingham | Apr. 13, 1954 |